(12) United States Patent
Kimura

(10) Patent No.: US 9,998,613 B2
(45) Date of Patent: Jun. 12, 2018

(54) INFORMATION PROCESSING APPARATUS AND MULTIFUNCTION PERIPHERAL HAVING OPENABLE UNIT AND DETECTOR

(71) Applicant: Oki Data Corporation, Tokyo (JP)

(72) Inventor: Toshiyuki Kimura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days. days.

(21) Appl. No.: 15/459,062

(22) Filed: Mar. 15, 2017

(65) Prior Publication Data

US 2017/0289365 A1 Oct. 5, 2017

(30) Foreign Application Priority Data

Mar. 31, 2016 (JP) .................................. 2016-070841

(51) Int. Cl.
*H04N 1/00* (2006.01)

(52) U.S. Cl.
CPC ....... *H04N 1/00082* (2013.01); *H04N 1/0032* (2013.01); *H04N 1/00037* (2013.01); *H04N 1/00551* (2013.01); *H04N 1/00557* (2013.01); *H04N 1/00602* (2013.01); *H04N 2201/0094* (2013.01)

(58) Field of Classification Search
CPC ........... H04N 1/00082; H04N 1/00602; H04N 1/00551; H04N 1/00557; H04N 1/00037; H04N 1/0032; H04N 2201/0094
See application file for complete search history.

(56) References Cited

U.S. PATENT DOCUMENTS

| 8,947,690 | B2 * | 2/2015 | Kadobayashi | ..... H04N 1/00896 358/1.13 |
| 2006/0071392 | A1 * | 4/2006 | Shyu | ........................ B65H 7/14 271/10.01 |
| 2007/0201113 | A1 * | 8/2007 | Nishikawa | ........... H04N 1/0057 358/506 |
| 2007/0291324 | A1 * | 12/2007 | Kamei | ............... H04N 1/00002 358/474 |
| 2009/0244659 | A1 * | 10/2009 | Ito | ...................... H04N 1/00525 358/498 |
| 2012/0026559 | A1 * | 2/2012 | Katsuda | ............... G03G 15/607 358/475 |
| 2012/0104692 | A1 * | 5/2012 | Tabuchi | ................... B65H 7/04 271/265.04 |

(Continued)

FOREIGN PATENT DOCUMENTS

JP 2010-136051 A 6/2010

*Primary Examiner* — Ming Hon
(74) *Attorney, Agent, or Firm* — Metrolexis Law Group, PLLC

(57) ABSTRACT

An information processing apparatus includes: a first unit as a main body of the information processing apparatus; a second unit openable and closable relative to the first unit; a third unit openable and closable relative to the second unit; and a controller programmed to control operations of the first unit. The second unit includes a first detector configured to detect whether the third unit is opened or closed relative to the second unit. When the second unit is in an opened position relative to the first unit, the first detector detects that the third unit is opened. The controller controls at least one of the first unit, the second unit, and the third unit based on a result of the detection by the first detector.

18 Claims, 11 Drawing Sheets

(56) References Cited

U.S. PATENT DOCUMENTS

2013/0222855 A1\* 8/2013 Niina ................. H04N 1/33315
 358/1.18
2016/0034026 A1\* 2/2016 Hanayama ............ G06F 1/3296
 713/323

\* cited by examiner

INFORMATION PROCESSING APPARATUS AND MULTIFUNCTION PERIPHERAL HAVING OPENABLE UNIT AND DETECTOR

CROSS REFERENCE TO RELATED APPLICATIONS

This application claims priority based on 35 USC 119 from prior Japanese Patent Application No. 2016-070841 filed on Mar. 31, 2016, entitled "MULTIFUNCTION PERIPHERAL", the entire contents of which are incorporated herein by reference.

BACKGROUND OF THE INVENTION

1. Field of the Invention

This disclosure relates to an information processing apparatus or a multifunction peripheral which includes units openable and closable relative to a main body thereof.

2. Description of Related Art

Among conventional multifunction printer, there is a printer provided with multiple openable and closable units which include an image scanner unit, as a first unit, turnable relative to the main body of the printer, and a document cover unit, as a second unit, turnable relative to the image scanner unit (see Japanese Patent Application Publication No. 2010-136051, for example).

SUMMARY OF THE INVENTION

In the conventional technique, open/close detection sensors need to be provided respectively to the units in order to detect whether each of the units is opened or closed, which requires installation spaces for the open/close detection sensors.

One of objects of an embodiment in this disclosure is to reduce the number of detectors which detect whether the corresponding units are opened and closed.

An aspect of the invention is an information processing apparatus that includes: a first unit as a main body of the information processing apparatus; a second unit openable and closable relative to the first unit; a third unit openable and closable relative to the second unit; and a controller programmed to control operations of the first unit. The second unit includes a first detector configured to detect whether the third unit is opened or closed relative to the second unit. When the second unit is in an opened position relative to the first unit, the first detector detects that the third unit is opened. The controller controls at least one of the first unit, the second unit, and the third unit based on a result of the detection by the first detector.

According to the aspect(s) of the invention, the detector can detect whether each of the units is opened or closed.

DETAILED DESCRIPTION OF EMBODIMENTS

Figure 1:
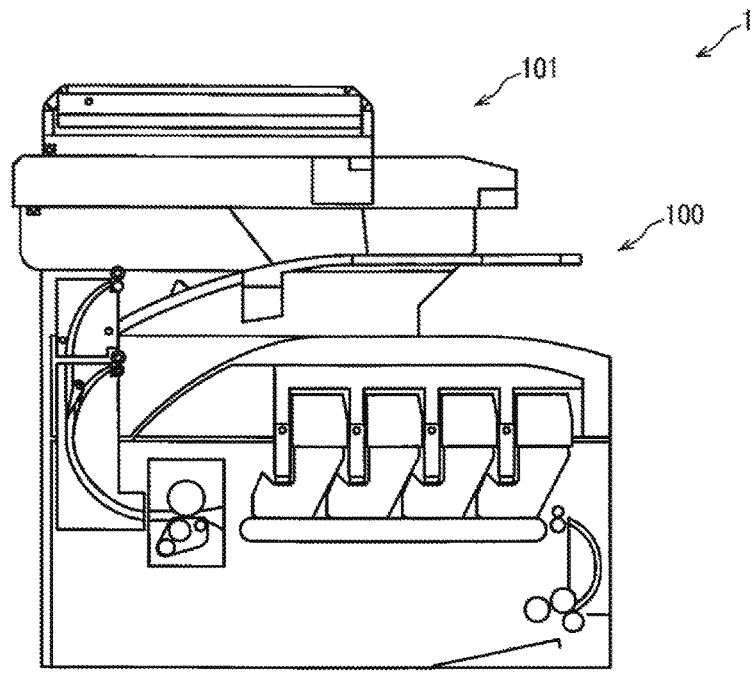
FIG. 1 is a schematic side cross-sectional view illustrating a configuration of a multifunction peripheral of an embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

FIG. 1 is a schematic side cross-sectional view illustrating a configuration of a multifunction peripheral of an embodiment.

In FIG. 1, multifunction peripheral 1 includes image formation unit 100 and image scanner unit 101.

Image formation unit 100 or a printer unit feeds print sheets as first media contained in a print sheet container or a first media container, and prints an image on the fed print sheet based on image data.

Image scanner unit 101 scans document sheets or an original as second media using an imaging device such as an imaging sensor, and generates image data of the document.

Multifunction peripheral 1, for example, scans a document to generate the image data of the document by image scanner unit 101, and forms a developer image based on the generated image date of the document on a print sheet(s) using image formation unit 100.

Figure 2:
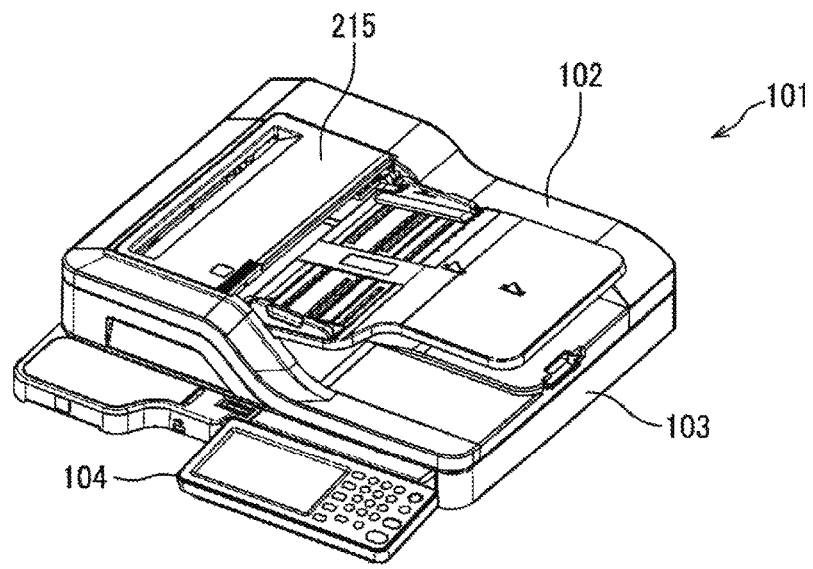
FIG. 2 is an external perspective view of an image scanner unit of the embodiment.

FIG. 2 is an external perspective view of the image scanner unit of the embodiment.

In FIG. 2, image scanner unit 101 includes document feeder unit 102 and flatbed unit 103.

Document feeder unit 102 picks up and transports the document, placed in a document stacker, on a one-by-one basis. The configuration of document feeder unit 102 is described in detail later.

Flatbed unit 103 includes glass surface 208 (see FIG. 3) as a platen or a document placement table, and imaging device 209 (see, FIG. 3) to scan the document on the platen. Document feeder unit 102 is attached to and pivotally supported by flatbed unit 103. Furthermore, flatbed unit 103 is provided with operation panel 104 to receive user's inputs and the like. Operation panel 104 is provided on the front side of image scanner unit 101.

As described above, image scanner unit 101 includes document feeder unit 102 which is openable and closable relative to flatbed unit 103.

Figure 3:
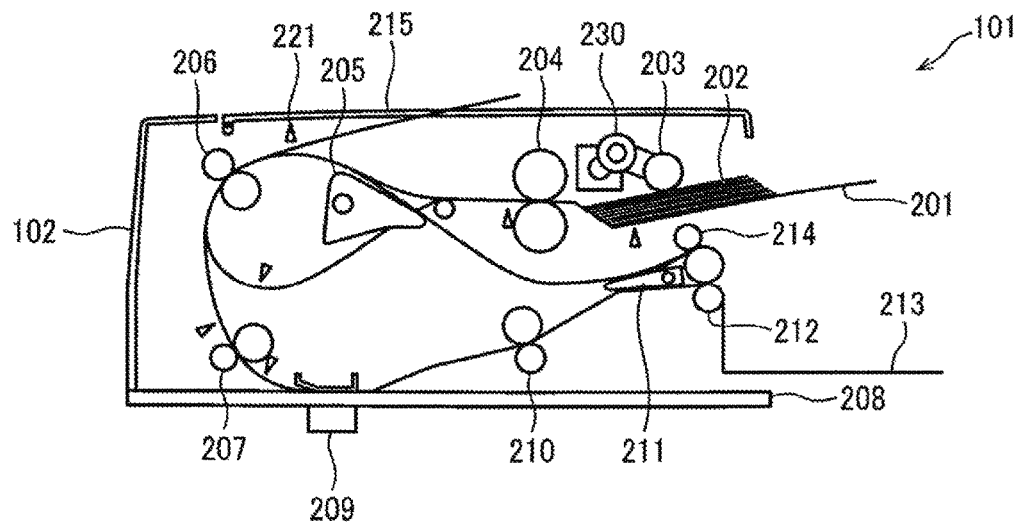
FIG. 3 is a schematic side cross-sectional view illustrating a configuration of a document feeder unit of the embodiment.

FIG. 3 is a schematic side cross-sectional view illustrating a configuration of the document feeder unit of the embodiment.

In FIG. 3, document feeder unit 102 includes document tray 201, feed roller 203, transport roller 204, first separator 205, first reverse roller 206, registration rollers 207, a guide member to press the document on glass surface 208 at the position facing imaging device 209, scan roller 210, second separator 211, discharge roller 212, discharged document stacker 213, second reverse roller 214, open/close cover 215, cover open/close detection sensor 221, and feed roller movement mechanism 230.

Document tray 201 serving as a document stacker is a place where the document as the second media to be scanned is placed.

Feed roller 203 picks up and transports document 202 from document tray 201, on a one-by-one basis, to a document conveyance path(s).

Transport roller 204 transports the document which has been transported by feed roller 203, along the document conveyance path(s).

First separator 205 switches the document conveyance path(s) for the document which has been transported by transport roller 204, depending on whether to read one or two sides of each document sheet.

First reverse roller 206 switches the document transport direction for the document which has been transported by transport roller 204, depending on whether to continue transporting the document, or to read the two sides of the document.

Registration rollers 207 perform skew correction on the document which has transported by first reverse roller 206.

Glass surface 208 of flatbed unit 103 is that which the transported document comes into contact with, and through which light transmits.

Imaging device 209 of flatbed unit 103 is an imaging sensor or the like which reads an image of the document in contact with glass surface 208.

Scan roller 210 transports the document from which imaging device 209 has read the image.

Second separator 211 switches the document conveyance path(s) for the document which has been transported by scan roller 210, depending on whether to read one or two sides of the document.

Discharge roller 212 discharges the document that has been scanned by the imaging device 209 and then transported by scan roller 210.

Discharge document stacker 213 is a place where the document discharged by discharge roller 212 are stacked.

Second reverse roller 214 switches, for the two-side reading, the document transport direction for the document whose first side has been read by imaging device 209.

Open/close cover 215 as a cover member is openably and closably provided to document feeder unit 102. When an error occurs, such as when a document gets stuck in the document conveyance path(s), the user opens open/close cover 215 to expose the document conveyance path(s) to the outside for the purpose of removing the document from the document conveyance path(s).

Cover open/close detection sensor 221 as a second detector detects whether open/close cover 215 is opened or closed.

As a movement mechanism, feed roller movement mechanism 230 moves feed roller 203 to a feed position at which feed roller 203 is in contact with document 202 placed in document tray 201, and a standby position at which feed roller 203 stays away from document tray 201.

Figure 4:
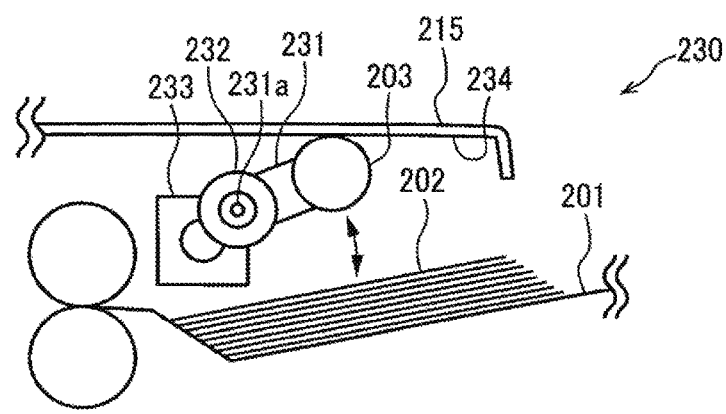
FIG. 4 is a schematic side cross-sectional view illustrating a configuration of a feed roller movement mechanism of the embodiment.

FIG. 4 is a schematic side cross-sectional view illustrating a configuration of the feed roller movement mechanism of the embodiment.

In FIG. 4, feed roller movement mechanism 230 includes feed roller 203, pick-up frame 231, torque limiter 232, motor 233, and stopper section 234 formed in open/close cover 215.

Pick-up frame 231 is provided to be turnable around rotation shaft 231a supported by the frame of document feeder unit 102, which is illustrated in FIG. 3, in directions indicated with arrows in FIG. 4. Pick-up frame 231 turnably supports feed roller 203 at its free end. The turning of pick-up frame 231 makes it possible to bring feed roller 203 into contact with document 202 placed in document tray 201, or to bring feed roller 203 away from document tray 201.

Torque limiter 232 is provided to rotation shaft 231a, and prevents feed roller 203 from being brought into contact with document 202 with a larger-than-predetermined force, or from being turned while in contact with stopper section 234.

Motor 233 is a drive source for turning pick-up frame 231.

Stopper section 234 is a frame which feed roller 203 hits when the turning of pick-up frame 231 brings feed roller 203 away from document tray 201.

Because of the above-discussed configuration, under the control of the controller, feed roller movement mechanism 230 is capable of bringing feed roller 203 into contact with document 202 placed in document tray 201, and bringing feed roller 203 away from document tray 201.

Figure 5:
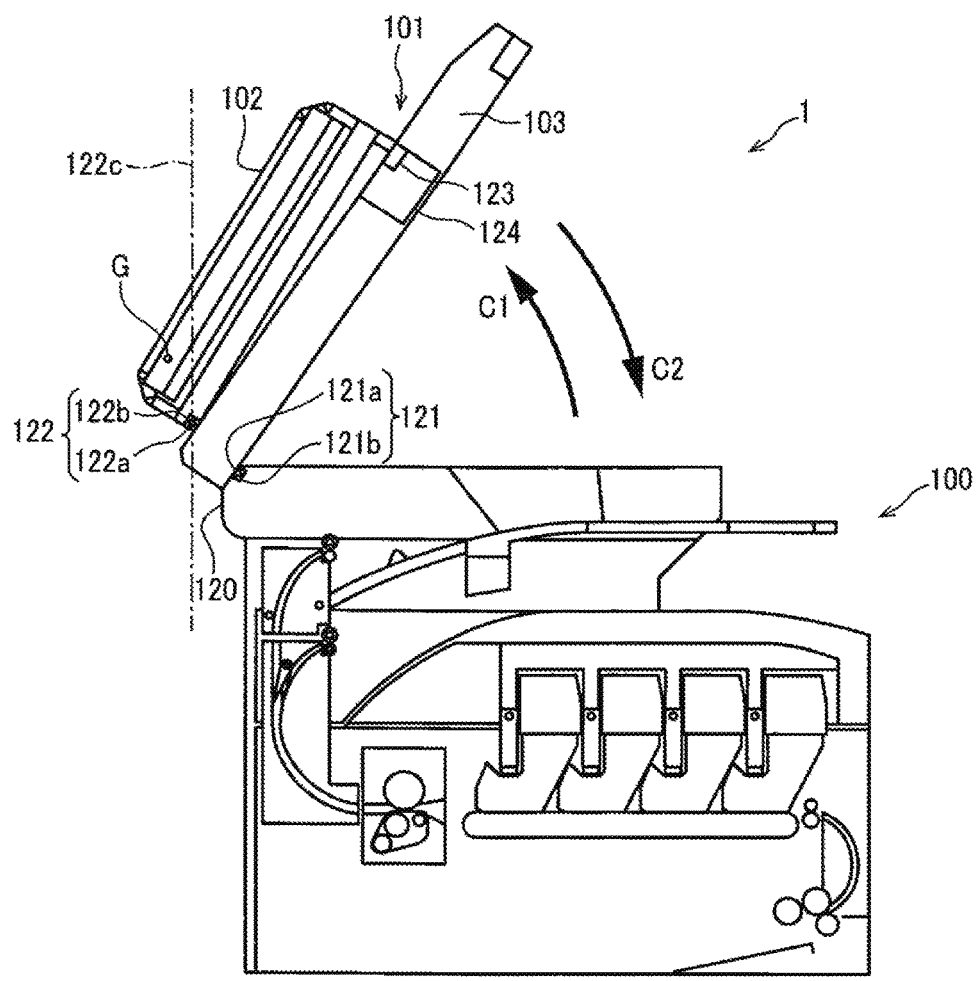
FIG. 5 is a schematic side cross-sectional view illustrating a configuration of the image scanner unit of the embodiment.

FIG. 5 is a schematic side cross-sectional view illustrating a configuration of the image scanner unit of the embodiment. Incidentally, FIG. 5 illustrates image scanner unit 101 as located at a position where image scanner unit 101 is opened relative to the main body of image formation unit 100.

In FIG. 5, image formation unit 100 serving as a main body of the multifunction peripheral includes frame 120 which openably and closably supports image scanner unit 101.

Image scanner unit 101 is provided to frame 120 to be turnable around rotation fulcrum 121. Frame 120 is fixed to the main body of image formation unit 100 of multifunction peripheral 1.

Rotation shaft 121a is provided to flatbed unit 103 of image scanner unit 101. Hole 121b formed in frame 120 pivotally supports rotation shaft 121a. Thus, image scanner unit 101 is provided to be turnable around rotation shaft 121a in an opening direction indicated with arrow C1 in FIG. 5, or in a closing direction indicated with arrow C2 in FIG. 5.

Document feeder unit 102 is provided to flatbed unit 103 to be turnable around rotation fulcrum 122.

Document feeder unit 102 is provided with rotation shaft 122a. Hole 122b formed in flatbed unit 103 pivotally supports rotation shaft 122a. Thus, document feeder unit 102 is provided to be turnable around rotation shaft 122a in the opening direction indicated with arrow C1 in FIG. 5, or in the closing direction indicated with arrow C2 in FIG. 5.

Rotation shafts 121a, 122a are arranged with their extension directions aligned substantially in parallel with each other. In the embodiment, rotation shafts 121a, 122a are located in the rear side of image scanner unit 101 (multifunction peripheral 1), for example.

When document feeder unit 102 is located at the fully-opened position with respect to flatbed unit 103 (see FIG. 5), center of gravity G of document feeder unit 102 is located downstream (in the direction opposite to the free end of document feeder unit 102) with respect to vertical line 122c passing through rotation shaft 122a, in the opening direction of document feeder unit 102 (the opening direction indicated with arrow C1 in FIG. 5).

Flatbed unit 103 includes open/close detector 123 and engagement mechanism 124, in addition to the imaging device 209 the glass surface 208 as the platen. Open/close detector 123 and engagement mechanism 124 are provided to flatbed unit 103 at positions which face the end portion of document feeder unit 102 which is opposite from rotation shaft 122a.

Open/close detector 123 serving as a first detector includes a sensor and the like which detect whether document feeder unit 102 is opened or closed relative to flatbed unit 103, and whether flatbed unit 103 is opened or closed relative to frame 120 of the image formation unit 100.

Engagement mechanism 124 engages with an engagement receiving section provided to document feeder unit 102 when flatbed unit 103 of image scanner unit 101 is opened relative to frame 120 of the image formation unit 100.

Furthermore, engagement mechanism 124 is formed such that a predetermined space is formed between flatbed unit 103 and document feeder unit 102 when engagement mechanism 124 engages with the engagement receiving portion.

Figure 6:
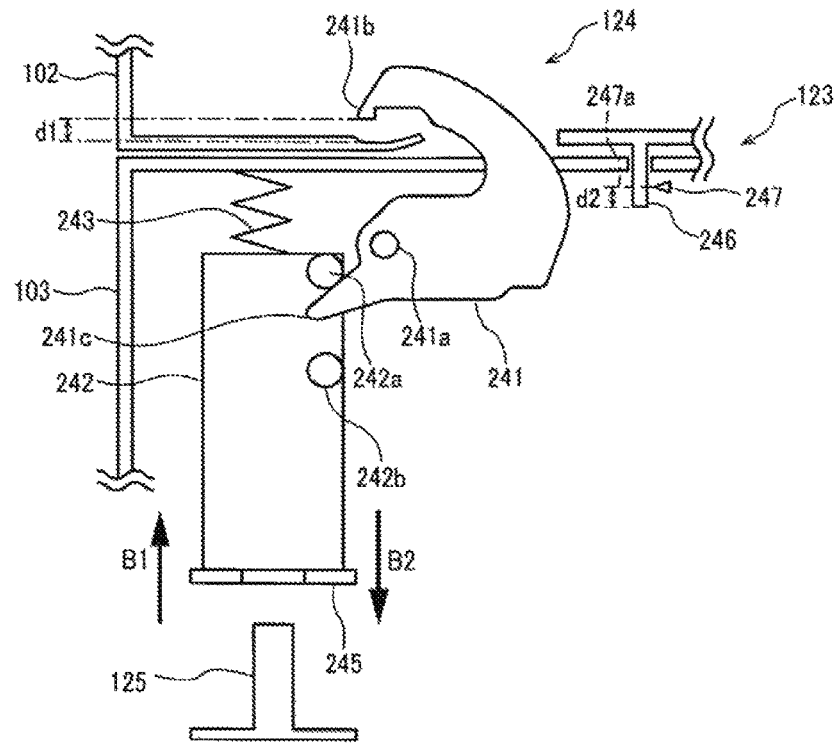
FIG. 6 is a side cross-sectional view illustrating a configuration of an engagement mechanism of the embodiment.
Figure 7:
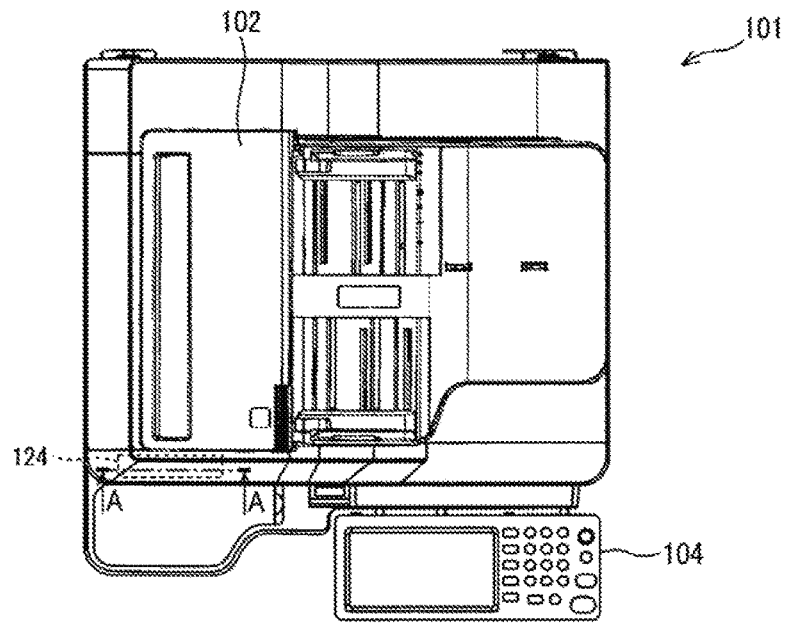
FIG. 7 is a top view of the image scanner unit of the embodiment.

FIG. 6 is a side cross-sectional view illustrating a configuration of the engagement mechanism of the embodiment. Incidentally, FIG. 6 is a cross-sectional view of engagement mechanism 124 taken along the A-A line of FIG. 7 which is a top view of the image scanner unit of the embodiment.

In FIG. 6, engagement mechanism 124 includes engagement member 241, link member 242, biasing member 243, and open/close detection sensor 247.

Engagement member 241 is a member provided to be turnable around rotation shaft 241a which the frame of flatbed unit 103 supports, and shaped substantially like the letter U or C. First end portion 241b of engagement member 241 is arranged in document feeder unit 102 through the holes respectively formed in flatbed unit 103 and document feeder unit 102. Second end portion 241c is arranged in engagement with the link member arranged inside flatbed unit 103.

Link member 242 is supported inside flatbed unit 103 to be movable up and down as indicated with arrows B1, B2 in FIG. 6 (in the direction of arrow B1 in which flatbed unit 103 comes closer to document feeder unit 102, or in the direction of arrow B2 in which flatbed unit 103 goes away from document feeder unit 102).

Link member 242 includes first and second engagement portions 242a, 242b which come into engagement with second end portion 241c of engagement member 241. When link member 242 moves in the direction indicated with arrow B1, second engagement portion 242b comes into engagement with second end portion 241c of engagement member 241. When link member 242 moves in the direction indicated with arrow B2, first engagement portion 242a comes into engagement with second end portion 241c of engagement member 241. Thereby, engagement member 241 turns.

Biasing member 243 is a spring or the like which is provided between flatbed unit 103 and link member 242, and which biases link member 242 in the direction indicated with arrow B2.

Figure 13A:
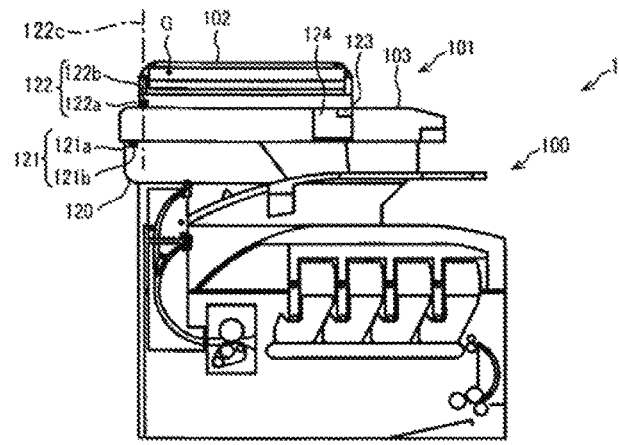
FIGS. 13A to 13C are diagrams for explaining how an open/close detection sensor detects whether the image scanner unit and the document feeder unit are opened or closed in the embodiment.
Figure 13B:
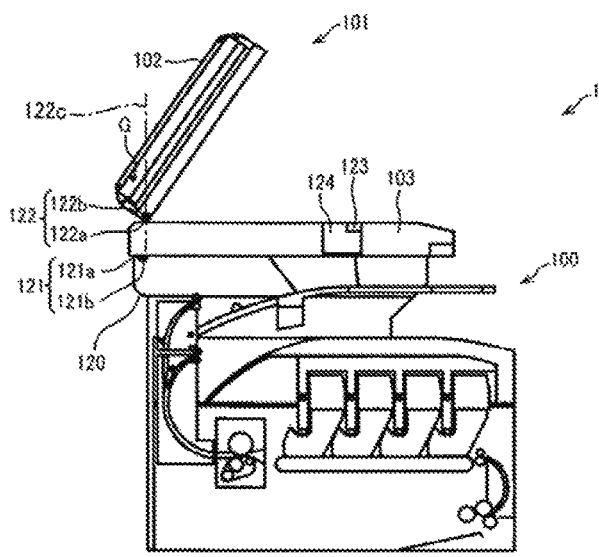
Figure 13C:
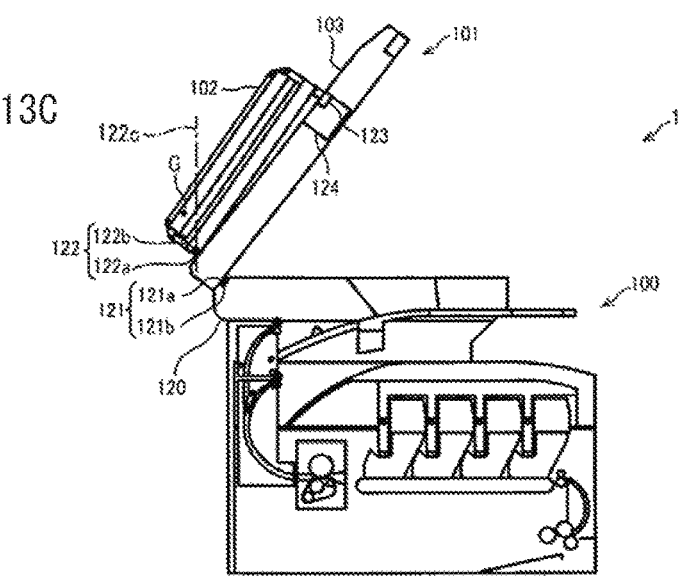
Figure 14A:
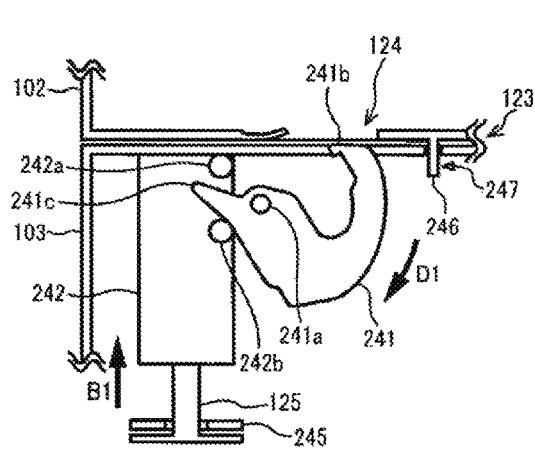
FIGS. 14A to 14D are explanatory diagrams illustrating how the engagement mechanism operates in the embodiment.
Figure 14B:
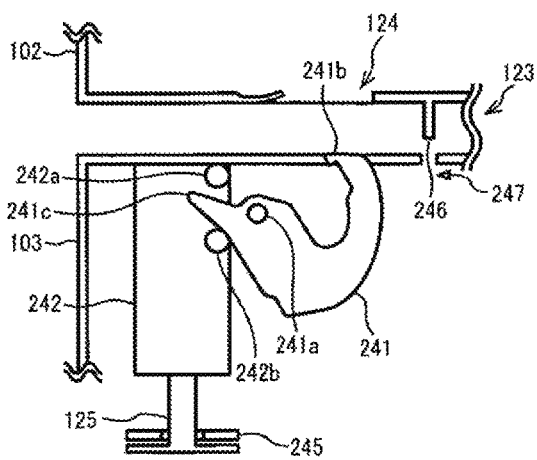

When the flatbed unit 103 is closed with respect to the image formation unit 100 (see, FIG. 13A), protrusion 125 (see, FIG. 5) provided to frame 120 of the image formation unit 100 comes into contact with link member 242, and thus link member 242 moves in the direction indicated with arrow B1 against biasing force of biasing member 243 (see FIGS. 14A and 14B). On the other hand, when the flatbed unit 103 is opened with respect to the image formation unit 100 (see FIG. 13C), protrusion 125 of image formation unit 100 moves away from link member 242, and thus link member 242 moves in the direction indicated with arrow B2 due to the bias force of biasing member 243 until link member 242 comes into contact with stopper 245 (see FIG. 14C). Once link member 242 comes into contact with stopper 245, link member 242 stops its movement (B1).

As shown in FIG. 5, in the state where link member 242 is in contact with stopper 245 by being biased by biasing member 243 (see FIG. 14C), a projecting portion of first end portion 241b of engagement member 241 is able to be engaged with a recess portion of document feeder unit 102, such that, if document feeder unit 102 is tried to be moved toward its full open position with respect to flatbed unit 103, the projecting portion of first end portion 241b of engagement member 241 is engaged with the recess portion of document feeder unit 102 to prevent document feeder unit 102 from moving to the full open position of document feeder unit 102 with respect to flatbed unit 103. In this state shown in FIG. 5, distance d1 is held between the projecting portion of first end portion 241b of engagement member 241 and the recessed portion of document feeder unit 102.

Open/close detection sensor 247 is provided to flatbed unit 103, and serves as open/close detector 123 illustrated in FIG. 5. Open/close detection sensor 247 is an optical sensor or the like which detects protrusion 246 formed on document feeder unit 102.

In the state where flatbed unit 103 is closed relative to frame 120 of the image formation unit 100 and document feeder unit 102 is closed relative to flatbed unit 103 (see FIGS. 13A and 14A), protrusion 246 of document feeder unit 102 is located in front of the optical axis of open/close detection sensor 247 in the flatbed unit 103, and thus detected by open/close detection sensor 247.

On the other hand, in the state where flatbed unit 103 is closed relative to frame 120 of the image formation unit 100 and document feeder unit 102 is opened relative to flatbed unit 103 (see FIGS. 13B and 14B), protrusion 246 of document feeder unit 102 is located outside of flatbed unit 103 (is not located in front of the optical axis of open/close detection sensor 247 in the flatbed unit 103), and thus is not detected by open/close detection sensor 247.

The position of open/close detection sensor 247 and the length of protrusion 246 of document feeder unit 102 are set such that distance d2 between optical axis 247a of open/close detection sensor 247 and the distal end of protrusion 246 along the longitudinal direction of the protrusion 246 in the state where document feeder unit 102 is closed with respect to flatbed unit 103. In other words, distance d1 is set longer than distance d2 between optical axis 247a of open/close detection sensor 247 and the distal end of protrusion 246 in the state where document feeder unit 102 is closed with respect to flatbed unit 103. Accordingly, in the state where flatbed unit 103 is fully-opened relative to frame 120 of the image formation unit 100 (see FIGS. 13C and 14D), document feeder unit 102 is moved to the slight open position relative to flatbed unit 103 as shown in FIG. 14D, and thereby protrusion 246 of document feeder unit 102 is located off the optical axis of open/close detection sensor 247 and is not detected by open/close detection sensor 247. The distance d1 is a distance which enables open/close detection sensor 247 to detect that document feeder unit 102 is slightly-opened relative to flatbed unit 103 in the state where flatbed unit 103 is fully-opened with respect to image formation unit 100.

Therefore, open/close detection sensor 247 does not detects protrusion 246, not only in the state where document feeder unit 102 is opened relative to flatbed unit 103 (see FIGS. 13A and 14C) but also in the state where flatbed unit 103 is fully opened relative to frame 120 of the image formation unit 100 (see FIGS. 13C and 14D). Thus, when not detecting protrusion 246, open/close detection sensor 247 can detects that: document feeder unit 102 is opened relative to flatbed unit 103; or flatbed unit 103 is fully opened relative to frame 120 of image formation unit 100. In other words, when image scanner unit 101 illustrated in FIG. 5 is in the fully-opened position with respect to image formation unit 100, open/close detector 123 detects that document feeder unit 102 is opened relative to flatbed unit 103 using open/close detection sensor 247.

Figure 8:
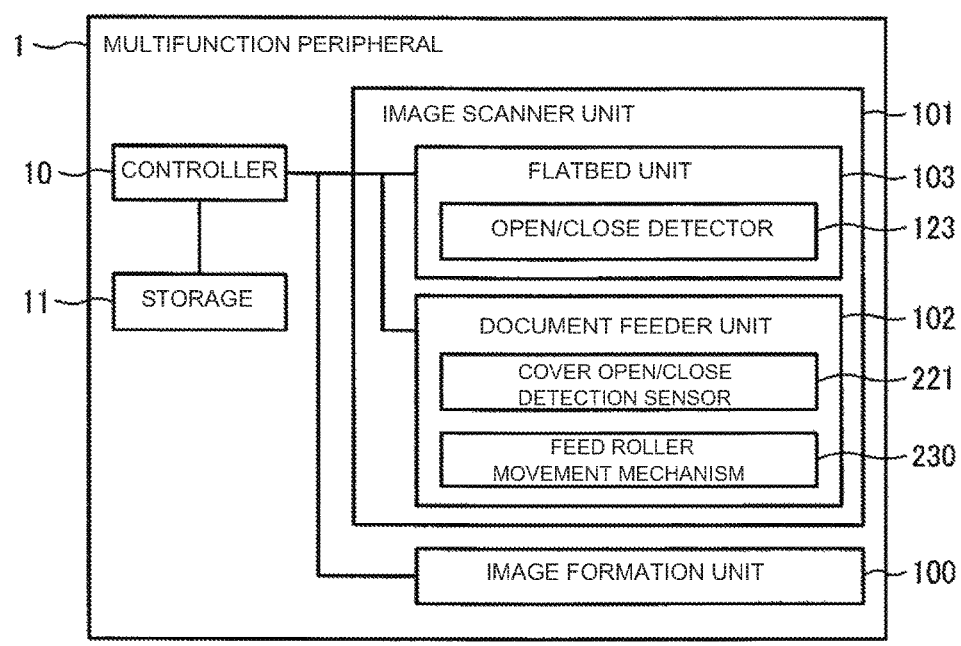
FIG. 8 is a block diagram illustrating a control configuration of the multifunction peripheral of the embodiment.

FIG. 8 is a block diagram illustrating a control configuration of the multifunction peripheral of the embodiment.

In FIG. 8, multifunction peripheral 1 includes controller 10 and storage 11.

Controller 10 includes a control device such as a central processing unit (CPU). Based on a control program (software) stored in storage 11, controller 10 controls image scanner unit 101 and image formation unit 100, and thereby controls the overall operation of multifunction peripheral 1. For example, controller 10 controls operations of a print engine in the image formation unit 100 (print operations), operations of imaging device 209 in the flat bet unit 102 (scan operations), operations of conveyance members in the document feeder unit 103 (document feed operations), or the like.

Storage 11 includes a memory and the like which stores: the control program for controlling the overall operation of multifunction peripheral 1; and information generated during various control processes.

Based on an output signal from open/close detector 123 in flatbed unit 103 in image scanner unit 101, controller 10 detects whether document feeder unit 102 is opened or closed relative to flatbed unit 103, and whether flatbed unit 103, namely image scanner unit 101, is opened or closed relative to frame 120. In the embodiment, when image scanner unit 101 is in the opened position, open/close detector 123 detects that document feeder unit 102 is opened or closed relative to flatbed unit 103; and based on the result of the detection by open/close detector 123, controller 10 controls image scanner unit 101 and image formation unit 100.

In addition, based on an output signal from cover open/close detection sensor 221 in document feeder unit 102 of image scanner unit 101, controller 10 detects whether open/close cover 215, illustrated in FIG. 3, is opened or closed relative to document feeder unit 102.

Furthermore, controller 10 controls feed roller movement mechanism 230 in document feeder unit 102, and thereby controls to move feed roller 203, illustrated in FIG. 3, to the feed position at which feed roller 203 is in contact with document 202 placed in document tray 201, or to the standby position at which feed roller 203 stays away from document tray 201. In the embodiment, when image scanner unit 101 moves from the opened position to the closed position, controller 10 controls feed roller movement mechanism 230 to perform control of moving feed roller 203 to the standby position. Meanwhile, when cover open/close detection sensor 221 detects that cover member 215, illustrated in FIG. 3, moves from the opened position to the closed position, controller 10 controls feed roller movement mechanism 230 to perform control of moving feed roller 203 to the standby position.

It should be noted that controller 10 includes time measurement device such as a timer.

Descriptions are provided for how the foregoing configuration works.

Figure 9:
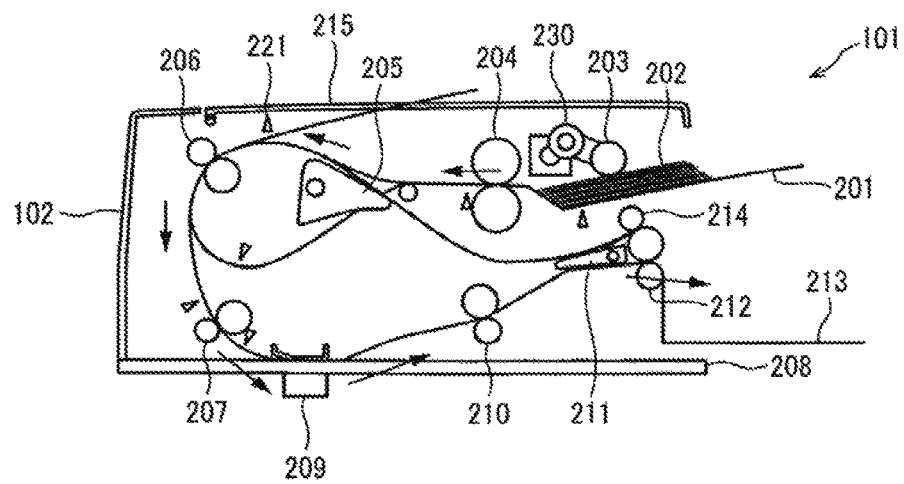
FIG. 9 is a diagram for explaining a document feed operation of the embodiment.

To begin with, descriptions are provided based on FIG. 9 for how the image scanner unit performs a one-side read operation on a document.

For example, the user moves image scanner unit 101 from the opened position to the closed position, placed document in document tray 201, and operates operation panel 104 illustrated in FIG. 2 to instruct image scanner unit 101 to start to read the document.

Once image scanner unit 101 detects the operation on operation panel 104 illustrated in FIG. 2 for instructing image scanner unit 101 and starts to read the document, controller 10 illustrated in FIG. 8 controls feed roller movement mechanism 230, and thereby move feed roller 203 from the standby position at which feed roller 203 stays away from the document to the feed position at which feed roller 203 is in contact with the document. Thereafter, as feed roller 203 rotates, feed roller 203 transports one of the document 202 placed in document tray 201 in the media transport direction indicated with the arrows in FIG. 9, and the document reaches transport roller 204.

The document which feed roller 203 transports travels via transport roller 204, the upper side of first separator 205, and first reverse roller 206, and reaches registration rollers 207.

Registration rollers 207 do not rotate at a time when the document reaches registration rollers 207. When the leading edge of the transported document hit (the pair of) registration rollers 207, registration rollers 207 correct the skew of the document.

After the correction of the skew of the document, registration rollers 207 is driven to start its rotation, and thereby transport the document to glass surface 208.

Once the document reaches glass surface 208, imaging device 209 reads the image on the document.

The document, whose image has been read by imaging device 209, is conveyed trough scan roller 210, the lower side of second separator 211, and discharge roller 212, and discharged to discharged document stacker 213.

Figure 10:
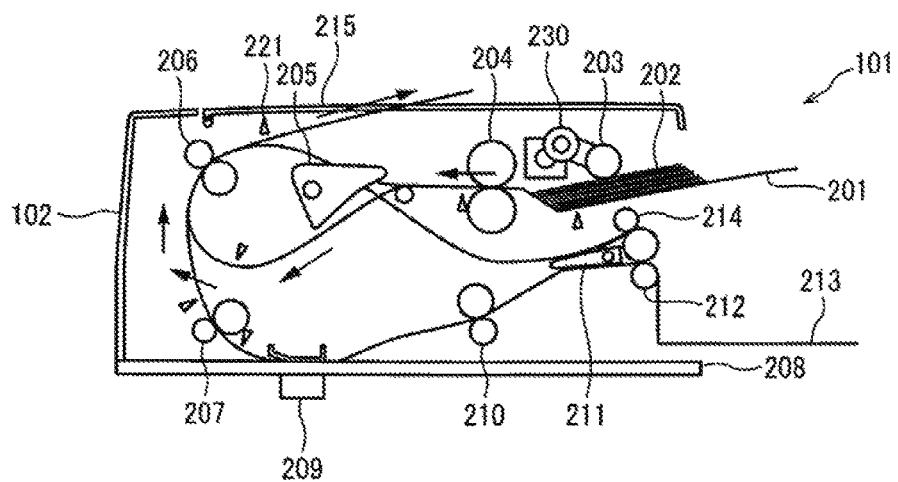
FIG. 10 is a diagram for explaining the document feed operation of the embodiment.
Figure 11:
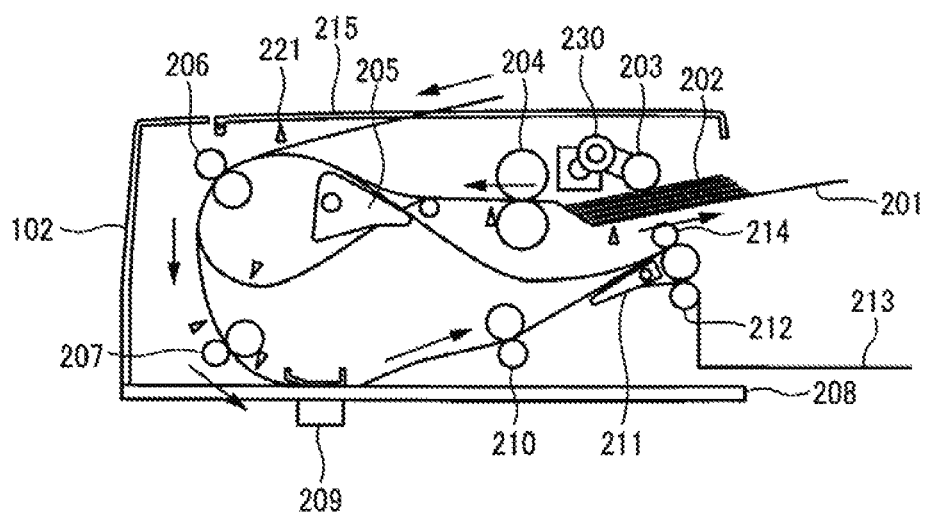
FIG. 11 is a diagram for explaining the document feed operation of the embodiment.
Figure 12:
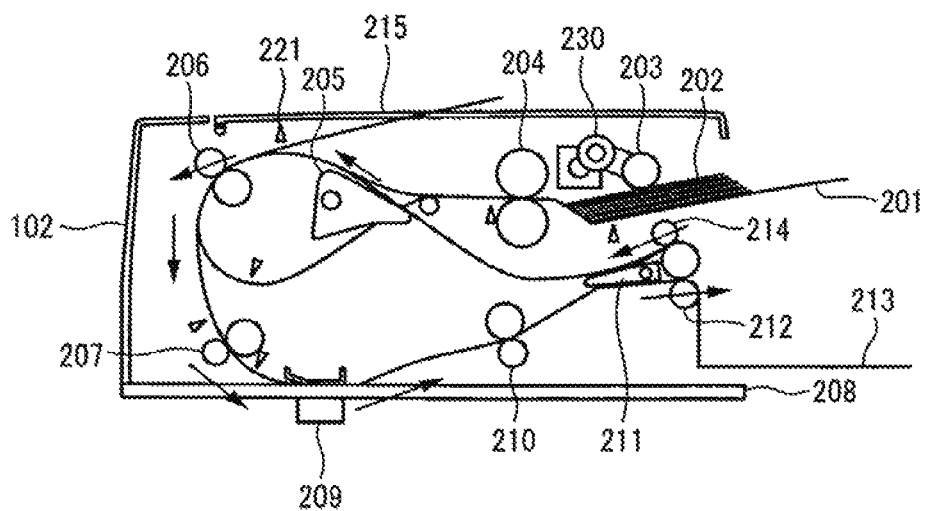
FIG. 12 is a diagram for explaining the document feed operation of the embodiment.

Descriptions are provided for how the image scanner unit performs a two-side read operation on an document based on FIGS. 10, 11 and 12.

Once image scanner unit 101 starts the document read operation, feed roller 203 rotates as illustrated in FIG. 10. Thereby, feed roller 203 transports one of the document 202, placed in document tray 201, in the media transport direction indicated with the arrows in FIG. 10, and the document 202 reaches transport roller 204.

The document which feed roller 203 transports travels via transport roller 204 and the lower side of first separator 205, and reaches first reverse roller 206.

Once as illustrated in FIG. 11, the trailing edge of the transported document reaches the upstream side of first reverse roller 206 in the media transport direction, first reverse roller 206 starts to rotate reversely, and thereby transports the document to registration rollers 207.

Registration rollers 207 do not rotate at a time when the document reaches registration rollers 207. When the leading edge of the transported document hit (the pair of) registration rollers 207, registration rollers 207 correct the skew of the document.

After the correction of the skew of the document, registration rollers 207 is driven to start its rotation, and thereby transport the document to glass surface 208.

Once the document reaches glass surface 208, imaging device 209 reads the image on a second side (rear side, for example) of the document.

The document, the image on whose second side imaging device 209 reads, is transported to second reverse roller 214 via scan roller 210, and the upper side of second separator 211. Once the trailing edge of the transported document passes through second separator 211, second separator 211 switches the document conveyance path.

Once as illustrated in FIG. 12, the trailing edge of the transported document reaches the upstream side of second reverse roller 214 in the media transport direction, second reverse roller 214 starts to rotate reversely, and thereby transports the document to registration rollers 207 via the upper side of first separator 205 and first reverse roller 206.

Registration rollers 207 do not rotate at a time when the document reaches registration rollers 207. When the leading edge of the transported document hit (the pair of) registration rollers 207, registration rollers 207 correct the skew of the document.

After the correction of the skew of the document, registration rollers 207 is driven to start its rotation, and thereby transport the document to glass surface 208.

Once the document reaches glass surface 208, imaging device 209 reads the image on a first side (front side, for example) of the document.

The document, the image on whose first side imaging device 209 reads, is transported to discharged document stacker 213 via scan roller 210, the lower side of second separator 211, and discharge roller 212.

Next, based on FIGS. 13A to 14D, descriptions are provided for how open/close detection sensor 247 detects whether the image scanner unit and the document feeder unit are opened or closed when the user turns the image scanner unit and the document feeder unit. Incidentally, FIGS. 14A to 14D are cross-sectional views of engagement mechanism 124 taken along the A-A line of FIG. 7

FIG. 13A illustrates the state in which: flatbed unit 103 of image scanner unit 101 is closed relative to frame 120 as the main body of image formation unit 100; and document feeder unit 102 is closed relative to flatbed unit 103.

In this state, center of gravity G of document feeder unit 102 is located closer to the free end of document feeder unit 102 than is vertical line 122c passing through rotation shaft 122a of document feeder unit 102.

Thus, the weight of document feeder unit 102 makes document feeder unit 102 turn around rotation shaft 122a in a direction in which document feeder unit 102 comes closer to flatbed unit 103.

In this case, as illustrated in FIG. 14A, link member 242 of engagement mechanism 124 comes in contact with protrusion 125, and moves in the direction indicated with arrow B1 in the drawing; second engagement portion 242b of link member 242 comes into contact with second end portion 241c of engagement member 241; and thus, engagement member 241 turns in a direction indicated with arrow D1 in the drawing. First end portion 241b of thus-turned engagement member 241 goes out of engagement with document feeder unit 102, and enters the inside of flatbed unit 103.

Thus, open/close detection sensor 247 detects protrusion 246 formed on document feeder unit 102, and thereby detects that: document feeder unit 102 is closed relative to flatbed unit 103; and flatbed unit 103 is closed relative to frame 120.

As discussed above, while flatbed unit 103 and document feeder unit 102 are closed relative to frame 120, engagement mechanism 124 is out of engagement with document feeder unit 102. Thus, the user can turn document feeder unit 102 in a direction in which document feeder unit 102 is opened relative to flatbed unit 103.

FIG. 13B illustrates a state in which: flatbed unit 103 of image scanner unit 101 is closed relative to frame 120 as the main body of image formation unit 100; and document feeder unit 102 is opened relative flatbed unit 103.

In this state, center of gravity G of document feeder unit 102 is located on the opposite side of vertical line 122c, passing through rotation shaft 122a of document feeder unit 102, from the free end of document feeder unit 102.

Thus, the weight of document feeder unit 102 makes document feeder unit 102 turn around rotation shaft 122a to go further away from flatbed unit 103 closed relative to frame 120.

In this case, since as illustrated in FIG. 14B, flatbed unit 103 is closed relative to frame 120, first end portion 241b of engagement member 241 stays inside flatbed unit 103 while out of engagement with document feeder unit 102 in the same way as in FIG. 14A.

Open/close detection sensor 247 does not detects protrusion 246 of document feeder unit 102, and detects that document feeder unit 102 is opened relative to flatbed unit 103.

Next, descriptions are provided for the operation to open flatbed unit 103 and document feeder unit 102 of image scanner unit 101 relative to frame 120 as the main body of image formation unit 100, from the state where flatbed unit 103 and document feeder unit 102 are closed relative to frame 120.

When the user turns flatbed unit 103 and document feeder unit 102 relative to frame 120 in the opening direction, if center of gravity G of document feeder unit 102 is located closer to the free end of document feeder unit 102 beyond vertical line 122c passing through rotation shaft 122a of document feeder unit 102, the weight of document feeder unit 102 makes document feeder unit 102 turn around rotation shaft 122a in the direction in which document feeder unit 102 comes closer to flatbed unit 103.

Figure 14C:
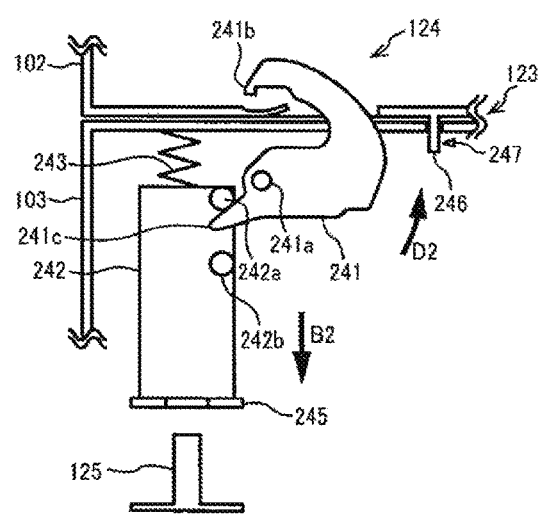
Figure 14D:
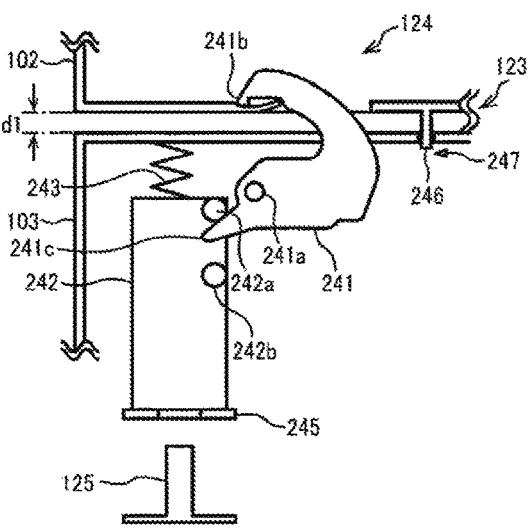

In this case, as illustrated in FIG. 14c, link member 242 of engagement mechanism 124 becomes separated from protrusion 125, and moves in the direction indicated with arrow B2 in the drawing; and first engagement portion 242a of link member 242 comes into engagement with second end portion 241c of engagement member 241, and engagement member 241 turns in the direction indicated with arrow D2 in the drawing. First end portion 241b of thus-turned engagement member 241 enters the inside of document feeder unit 102.

In this state, document feeder unit 102 is disposed in contact with flatbed unit 103.

As discussed above, while flatbed unit 103 and document feeder unit 102 are opened relative to frame 120, engagement mechanism 124 comes into engagement with document feeder unit 102. Thus, engagement mechanism 124 is capable of restricting the turn of document feeder unit 102 relative to flatbed unit 103 in the opening direction.

When the user turns flatbed unit 103 and document feeder unit 102 further, as illustrated in FIG. 13C, flatbed unit 103 and document feeder unit 102 of image scanner unit 101 becomes opened relative to frame 120 as the main body of image formation unit 100, center of gravity G of document feeder unit 102 is located in the opposite side of vertical line 122c, passing through rotation shaft 122a of document feeder unit 102, from the free end of document feeder unit 102.

Thus, the weight of document feeder unit 102 makes document feeder unit 102 turn around rotation shaft 122a to go further away from flatbed unit 103.

In this case, as illustrated in FIG. 14D, the distal end (protrusion) of first end portion 241b of engagement member 241 of engagement mechanism 124, located inside flatbed unit 103, is in contact with the recessed portion of document feeder unit 102, and the clearance of distance d1 is formed between document feeder unit 102 and flatbed unit 103.

As discussed above, when image scanner unit 101 is in the opened position, engagement member 241 of engagement mechanism 124 engages with document feeder unit 102 at the position where document feeder unit 102 is opened at predetermined distance d1 from flatbed unit 103.

Since open/close detection sensor 247 does not detect protrusion 246 of document feeder unit 102, open/close detection sensor 247 detects that flatbed unit 103 is opened relative to frame 120.

In addition, since the distal end (protrusion) of first end portion 241b of engagement member 241 of engagement mechanism 124 is in contact with the recessed portion of document feeder unit 102, engagement mechanism 124 restricts the turn of document feeder unit 102 relative to flatbed unit 103 in the opening direction.

As discussed above, this embodiment is configured such that a single open/close detection sensor 247 detects whether document feeder unit 102 and flatbed unit 103 of image scanner unit 101 is opened or closed. This configuration makes it possible to detect whether the units are opened or closed without increasing the size of the printer.

Figure 15A:
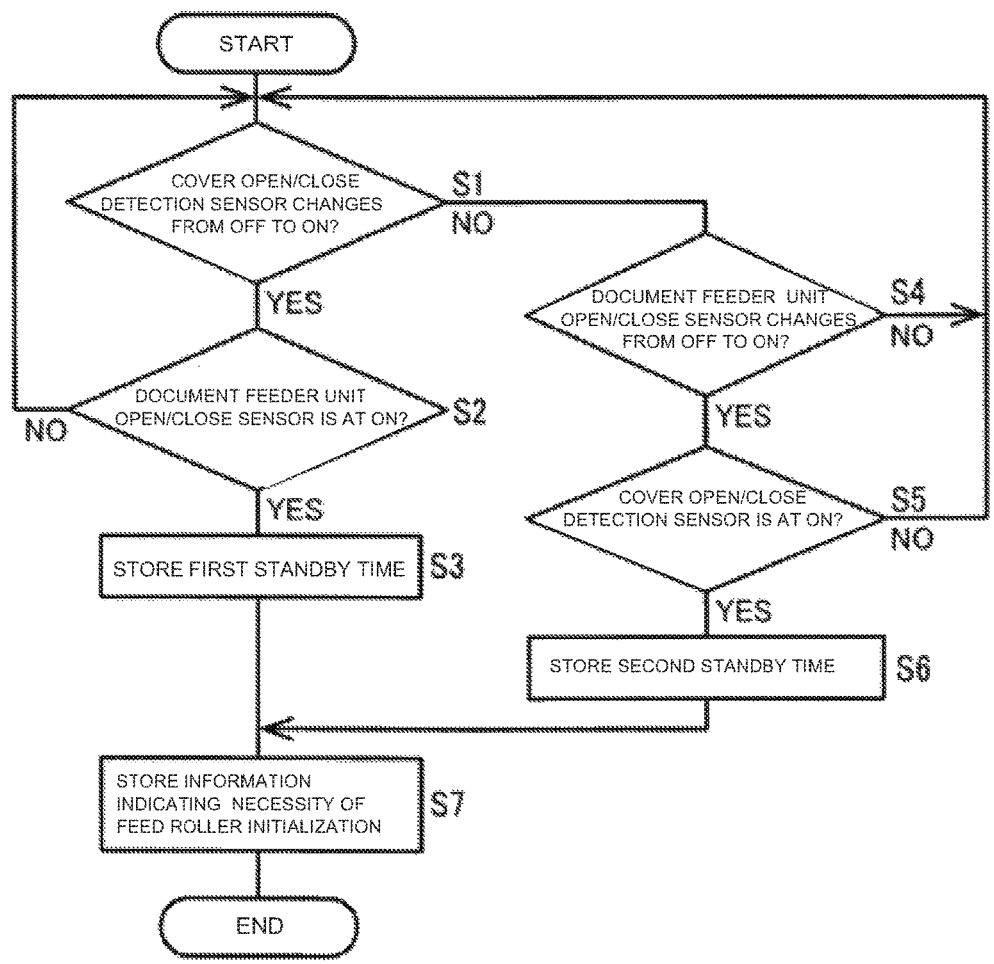
FIGS. 15A and 15B are flowcharts illustrating procedures of a feed roller initialization process of the embodiment.
Figure 15B:
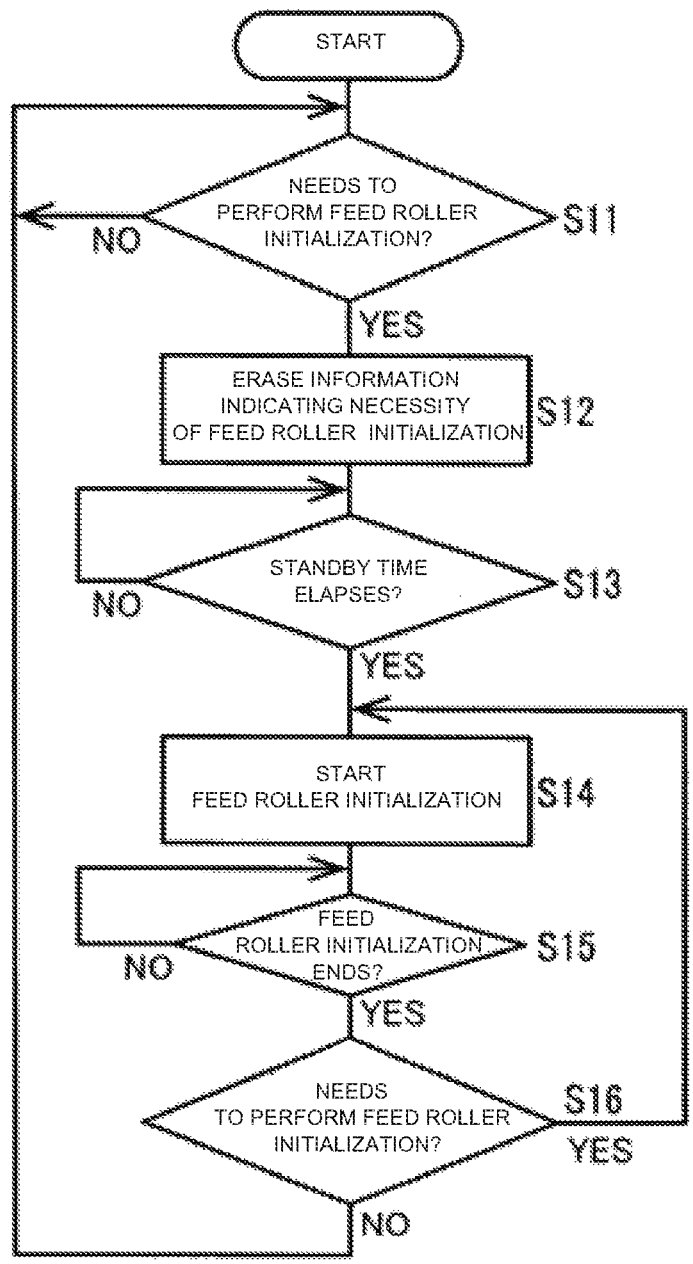

Next, a feed roller initializing process of the embodiment which the multifunction peripheral performs is described by referring to FIGS. 8 and 13A to 13C, and by following steps, whose reference signs starts with the letter S, in FIGS. 15A and 15B illustrating a flowchart representing a procedure of the feed roller initializing process. Incidentally, FIG. 15A represents the opened/closed state detection process for detecting that open/close cover 215 and document feeder unit 102 change from the opened state to the closed state, or that flatbed unit 103 changes from the opened state to the closed state; and FIG. 15B represents how the multifunction peripheral performs the feed roller initializing process.

To begin with, the opened/closed state detection process is described based on FIG. 15A. This opened/closed state detection process is that which the multifunction peripheral activates at predetermined intervals.

In step S1, controller 10 of multifunction peripheral 1 determines whether the output signal from cover open/close detection sensor 221 of image scanner unit 101 changes from OFF to ON, namely whether open/close cover 215 changes from the opened state (OFF) to the closed state (ON). When controller 10 determines that open/close cover 215 changes from the opened state to the closed state, controller 10 proceeds to a process in step S2. When controller 10 determines that open/close cover 215 does not change from the opened state to the closed state, controller 10 proceeds to a process in step S4.

In step S2, after determining that open/close cover 215 changes from the opened state (OFF) to the closed state (ON), controller 10 determines whether the output signal from open/close detector 123 of image scanner unit 101 is at ON, namely whether document feeder unit 102 and flatbed unit 103 are in the closed state (ON). When controller 10 determines that document feeder unit 102 and flatbed unit 103 are in the closed state (ON), controller 10 proceeds to a process in step S3. When controller 10 determines that document feeder unit 102 and flatbed unit 103 are in the opened state (OFF), controller 10 proceeds to a process in step S1.

In step S3, controller 10 makes a first standby time until the start of the operation of initialing feed roller 203 stored in storage 11, and proceeds to a process in step S7.

In step S4, on the other hand, after controller 10 determines in step S1 that open/close cover 215 does not change from the opened state (OFF) to the closed state (ON), controller 10 determines whether the output signal from open/close detector 123 of image scanner unit 101 changes from OFF to ON, namely whether document feeder unit 102 and flatbed unit 103 change from the opened state (OFF) to the closed state (ON). When controller 10 determines that document feeder unit 102 and flatbed unit 103 change from the opened state to the closed state, controller 10 proceeds to a process in step S5. When controller 10 determines that document feeder unit 102 and flatbed unit 103 does not change from the opened state to the closed state, controller 10 proceeds to the process step S1.

In step S5, after controller 10 determines that document feeder unit 102 and flatbed unit 103 change from the opened state (OFF) to the closed state (ON), controller 10 determines whether the output signal from cover open/close detection sensor 221 of image scanner unit 101 is at ON, namely whether open/close cover 215 is in the closed state (ON). When controller 10 determines that open/close cover 215 is in the closed state (ON), controller 10 proceeds to a process in step S6. When controller 10 determines that open/close cover 215 is in the opened state (OFF), controller 10 proceeds to the process in step S1.

In step S6, controller 10 makes a second standby time until the start of the operation of initializing feed roller 203 stored in storage 11, and proceeds to the process in step S7.

Here, the second standby time is shorter than the first standby time. This is because shortly after open/close cover 215 changes from the opened state to the closed state, namely shortly after the user closes open/close cover 215, the user sometimes operates document feeder unit 102, such as to open open/close cover 215 again.

In step S7, controller 10 makes storage 11 store information indicating necessity of feed roller initialization which is information saying that feed roller 203 needs to be initialized, and terminates the process.

Next, based on FIG. 15B, descriptions are provided for how controller 10 performs another feed roller initialization process.

In step S11, controller 10 of multifunction peripheral 1 determines whether the information indicating necessity of feed roller initialization is stored in storage 11. When controller 10 determines that the information indicating necessity of feed roller initialization is stored in storage 11, namely that the feed roller initialization needs to be performed, controller 10 proceeds to a process in step S12. When controller 10 determines that no information indicating necessity of feed roller initialization is stored in storage 11, controller 10 repeats this step.

In step S12, after controller 10 determines that the information indicating necessity of feed roller initialization is stored in storage 11, controller 10 erases the information indicating necessity of feed roller initialization from storage 11.

In step S13, controller 10 reads the first standby time or the second standby time which is stored in storage 11 in step S3 or S6 in FIG. 15A, and waits until the thus-read standby time elapses. Once controller 10 detects that the standby time elapses, controller 10 proceeds to a process in steps S14.

In step S14, controller 10 controls feed roller movement mechanism 230, and starts the feed roller initialization of making feed roller 203 go away from document tray 201.

As discussed above, a first predetermined time (standby time) after image scanner unit 101 moves from the opened position to the closed position, controller 10 starts to perform the control of moving feed roller 203 to the standby position. A second predetermined time, which is longer than the first predetermined time, after the cover member 215 moves from the opened position to the closed position, controller 10 starts to perform the control of moving feed roller 203 to the standby position.

In step S15, controller 10 monitors whether the feed roller initialization ends. When controller 10 determines that the feed roller initialization ends, controller 10 proceeds to a process in step S16.

In step S16, after determining that the feed roller initialization ends, controller 10 determines whether the information indicating necessity of feed roller initialization gets stored in storage 11 in the opened/closed state detection process, illustrated in FIG. 15A, during the feed roller initialization. When controller 10 determines that the information indicating necessity of feed roller initialization gets stored in storage 11, controller 10 proceeds to the process in step S14. When controller 10 determines that the information indicating necessity of feed roller initialization does not get stored in storage 11, controller 10 returns to the process in step S11.

Here, in the case where during the feed roller initialization, open/close cover 215 changes from the opened state to the closed state and both document feeder unit 102 and flatbed unit 103 are in the closed state, or in the case where unit 102 and flatbed unit 103 change from the opened state to the closed state and open/close cover 215 is in the closed state, there is likelihood that feed roller 203 goes away from document 202 placed in document tray 201. For this reason, controller 10 performs the feed roller initialization again to make sure that feed roller 203 comes into contact with document 202 placed in document tray 201. Incidentally, controller 10 starts this second feed roller initialization at once without waiting until the standby time elapses.

As discussed above, in the embodiment, controller 10 controls the initialization operation for feed roller 203 such that the standby time from the open/close detection of document feeder unit 102 to the start of the initialization operation is shorter than the standby time from the open/close detection of open/close cover 215 to the start of the initialization operation. This makes it possible for the user to place document in document tray 201, and for image scanner unit 101 to start to read document, right after the user closes document feeder unit 102.

As described above, the embodiment is configured such that: the flatbed unit of the image scanner unit is provided with the open/close detector that detects whether the document feeder unit is opened or closed; and when the flatbed unit of the image scanner unit is in the opened position at the open/close detector, the open/close detector detects that the document feeder unit is opened. This configuration makes it possible to detect both whether the flatbed unit is opened or closed, and whether the document feeder unit is opened or closed, using only the single open/close detector. Accordingly, the embodiment brings about the effect of being capable of detecting whether each of the units is opened or closed, while avoiding an increase in the size of the printer.

Furthermore, since the standby time from the open/close detection of the document feeder unit to the start of the initialization operation is shorter than the standby time from the open/close detection of the open/close cover to the start of the initialization operation, it is possible for the user to place document in the document tray, and for the image scanner unit to start to read document, right after the user closes the document feeder unit.

It should be noted that the invention is not limited to the multifunction peripheral, but applicable to an image formation apparatus, an image read apparatus and a facsimile apparatus which each include units openable and closable relative to the apparatus.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An information processing apparatus comprising:
   a first unit as a main body of the information processing apparatus;
   a second unit openable and closable relative to the first unit;
   a third unit openable and closable relative to the second unit; and
   a controller programmed to control an operation of the first unit, wherein
   the second unit includes a first detector configured to detect whether the third unit is opened or closed with respect to the second unit, wherein
   the second unit and the third unit are arranged such that when the second unit is in an opened position relative to the first unit, the first detector detects that the third unit is opened and thereby detects a state in which the second unit is opened with respect to the first unit, and
   the controller controls at least one of the first unit, the second unit, and the third unit based on a result of the detection by the first detector.

2. The information processing apparatus according to claim 1, wherein
   the second unit comprises an engagement member at which the second unit engages with the third unit when the second unit is in the opened position, and
   when the second unit is in the opened position, the engagement member engages with the third unit at a position where the third unit is opened at a predetermined distance from the second unit.

3. The information processing apparatus according to claim 2, wherein
   the predetermined distance is a distance which enables the first detector to detect that the third unit is opened relative to the second unit.

4. A multifunction peripheral comprising the information processing apparatus according to claim 1; wherein
the second unit is a flatbed unit and the third unit is a document feeder unit such that the second and third units form an image scanner unit, and
the first unit is a printer unit as the main body which openably and closably supports the flatbed unit of the image scanner unit.

5. The multifunction peripheral according to claim 4, wherein
the document feeder unit is turnable around a rotation shaft relative to the flatbed unit in opening and closing directions, and
when the document feeder unit is in an opened position, the center of gravity of the document feeder unit is located downstream with respect to the rotation shaft in the opening direction of the document feeder unit.

6. The multifunction peripheral according to claim 5, wherein
the flatbed unit is turnable around a rotation shaft relative to the printer unit in opening and closing directions, and
the rotation shaft of the flatbed unit and the rotation shaft of the document feeder unit are disposed substantially in parallel to each other.

7. The multifunction peripheral according to claim 4, wherein
the flatbed unit comprises an engagement member which engages with the document feeder unit when the flatbed unit is in the opened position, and
when the flatbed unit is in the opened position, the engagement member engages with the document feeder unit at a position where the document feeder unit is opened at a predetermined distance from the flatbed unit.

8. The multifunction peripheral according to claim 7, wherein
the predetermined distance is a distance which enables the first detector to detect that the document feeder unit is opened relative to the flatbed unit.

9. The multifunction peripheral according to claim 4, wherein
the document feeder unit comprises
a media stacker on which a medium is placed,
a feed roller configured to feed the medium placed on the media stacker, and
a movement mechanism configured to move the feed roller to a feed position and to a standby position, wherein
when the flatbed unit moves from the opened position to the closed position, the controller controls the movement mechanism to move the feed roller to the standby position.

10. The multifunction peripheral according to claim 9, wherein
the document feeder unit comprises
a cover member openable and closable relative to the document feeder unit, and
a second detector configured to detect whether the cover member is opened and closed, wherein
when the second detector detects that the cover member moves from an opened position to a closed position, the controller controls the movement mechanism to move the feed roller to the standby position.

11. The multifunction peripheral according to claim 10, wherein
the controller
starts to perform control of moving the feed roller to the standby position a first predetermined time after the flatbed unit moves from the opened position to the closed position, and
starts to perform control of moving the feed roller to the standby position a second predetermined time after the cover member moves from the opened position to the closed position, and
the first predetermined time is shorter than the second predetermined time.

12. The information processing apparatus according to claim 1, wherein the first detector detecting that the third unit is opened and thereby detecting the state in which the second unit is opened with respect to the first unit causes the first detector detecting:
(i) a first state in which the second unit is closed with respect to the first unit and in which the third unit is closed with respect to the second unit,
(ii) a second state in which the second unit is closed with respect to the first unit and in which the third unit is opened with respect to the second unit, and
(iii) a third state in which the second unit is opened with respect to the first unit.

13. An information processing apparatus comprising:
a first unit as a main body of the information processing apparatus;
a second unit openable and closable with respect to the first unit;
a third unit openable and closable with respect to the second unit;
a first detector configured to detect whether the third unit is opened or closed with respect to the second unit, and
a controller programmed to control an operation of the first unit, and to control an operation of at least one of the second and third units based on the detection by the first detector,
wherein the second and third units are arranged such that the third unit is closed with respect to the second unit in the state where the second unit is in a close position with respect to the first unit, and such that the third unit is opened with respect to the second unit in the state where the second unit is in a full open position with respect to the first unit, which causes the first detector to detect an open state of the third unit with respect to the second unit in the state where the second unit is in the full open position with respect to the first unit in addition to in the state where the third unit is opened with respect to the second unit.

14. The information processing apparatus according to claim 13, further comprising an engagement mechanism which allows the third unit to move to a full open position respect to the second unit in the state where the second unit is in the closed position with respect to the first unit and which stops the third unit at a slight open position with respect to the second unit in the state where the second unit is in the full open position.

15. The information processing apparatus according to claim 14, wherein
the engagement mechanism includes an engagement member rotatably supported by the second unit, (i) such that the engagement member is rotated into a first rotation position where the engagement member is unable to be engaged with the third unit in the state where the second unit is in the closed position with respect to the first unit thereby to allow the third unit to move to the full open position with respect to the second unit, and (ii) such that the engagement member is rotated into a second rotation position where the engagement member is able to engaged with the third unit in the state where the second unit is opened with respect to the first unit, to stop the third unit at the slight open position in the state where the second unit is in the full open position with respect to the first unit.

16. The information processing apparatus according to claim 15, wherein
the engagement mechanism includes a link member supported by the second unit such that the link member makes the engagement member rotated into the first rotation position in the state where the second unit is in the closed position with respect to the first unit and such that the link member makes the engagement member rotated into the second rotation position in the state where the second unit is opened with respect to the first unit.

17. The information processing apparatus according to claim 13, wherein
a first unit comprises a printer unit configured to print on a first medium based on image data,
a second unit comprise a flatbed unit including a platen and an imaging device configured to acquire image data of a second medium on the platen, and
a third unit comprise a document feeder unit configured to feed the second medium to the platen along a conveyance path from a second media stacker to a discharged second media stacker.

18. The information processing apparatus according to claim 17, wherein
the document feeder unit includes: a feed roller in vicinity of the second media stacker and configured to feed the second media stacked on the second media stacker to the conveyance path; and a movement mechanism configured to move the feed roller to a feed position where the feed roller is in contact with the stacked second media and a standby position where the feed roller stays away from the stacked second media, and
the controller controls the movement mechanism to move the feed roller to the standby position when the first detector detects that the third unit comprising the document feeder unit moves from the open position to the closed position with respect to the second unit comprising the flatbed unit.

* * * * *